United States Patent
Byron et al.

(10) Patent No.: US 9,318,027 B2
(45) Date of Patent: *Apr. 19, 2016

(54) CACHING NATURAL LANGUAGE QUESTIONS AND RESULTS IN A QUESTION AND ANSWER SYSTEM

(71) Applicant: International Business Machines Corporation, Armonk, NY (US)

(72) Inventors: Donna K. Byron, Petersham, MA (US); Lakshminarayanan Krishnamurthy, Round Rock, TX (US); Edward E. Seabolt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,344

(22) Filed: Sep. 19, 2014

(65) Prior Publication Data

US 2015/0044660 A1     Feb. 12, 2015

Related U.S. Application Data

(63) Continuation of application No. 13/923,029, filed on Jun. 20, 2013.

(51) Int. Cl.
    *G06F 17/00*      (2006.01)
    *G09B 7/00*      (2006.01)
    *G09B 7/02*      (2006.01)
    *G06F 17/30*      (2006.01)

(52) U.S. Cl.
     CPC .. *G09B 7/00* (2013.01); *G09B 7/02* (2013.01); *G06F 17/30696* (2013.01)

(58) Field of Classification Search
     None
     See application file for complete search history.

(56) References Cited

U.S. PATENT DOCUMENTS

| | | |
|---|---|---|
| 5,519,608 A | 5/1996 | Kupiec |
| 7,809,664 B2 | 10/2010 | Heck |
| 8,032,507 B1 | 10/2011 | Bayardo et al. |
| 8,166,203 B1 | 4/2012 | Yang |
| 8,392,360 B1 * | 3/2013 | Dicker et al. ............. 707/608 |

(Continued)

FOREIGN PATENT DOCUMENTS

WO    WO 2010/061285 A2    6/2010

OTHER PUBLICATIONS

Harabagiu et al., "Falcon: Boosting Knowledge for Answer Engines", 2000, Proceedings of the 9th Text Retrieval Conference, pp. 1-10.*

(Continued)

*Primary Examiner* — Stanley K Hill
*Assistant Examiner* — Paulinho E Smith
(74) *Attorney, Agent, or Firm* — Francis Lammes; Stephen J. Walder, Jr.; Reza Sarbakhsh

(57) ABSTRACT

Mechanisms are provided for answering an input question. An input question to be answered from a source is received and processed to one or more extract features of the input question. The extracted one or more features are compared to cached features stored in one or more entries of a question and answer (QA) cache. A determination is made as to whether there is a matching entry in the one or more entries of the QA cache based on results of the comparing and, if so, candidate answer information is retrieved from the matching entry. The retrieved candidate answer information is returned to the source of the input question as candidate answer information for answering the input question.

8 Claims, 4 Drawing Sheets

(56) References Cited

U.S. PATENT DOCUMENTS

| | | | |
|---|---|---|---|
| 8,484,015 B1* | 7/2013 | Wolfram et al. | 704/9 |
| 8,769,417 B1* | 7/2014 | Robinson et al. | 715/751 |
| 8,832,584 B1* | 9/2014 | Agarwal et al. | 715/776 |
| 2005/0266387 A1* | 12/2005 | Rossides | 434/323 |
| 2007/0022109 A1* | 1/2007 | Imielinski et al. | 707/4 |
| 2009/0106307 A1* | 4/2009 | Spivack | 707/103 R |
| 2009/0248659 A1* | 10/2009 | McCool et al. | 707/5 |
| 2009/0259642 A1 | 10/2009 | Cao et al. | |
| 2009/0287678 A1* | 11/2009 | Brown et al. | 707/5 |
| 2010/0131265 A1* | 5/2010 | Liu et al. | 704/9 |
| 2011/0066587 A1* | 3/2011 | Ferrucci et al. | 706/54 |
| 2011/0125734 A1* | 5/2011 | Duboue et al. | 707/723 |
| 2011/0238686 A1* | 9/2011 | Bergstraesser et al. | 707/769 |
| 2011/0295824 A1 | 12/2011 | Schneider | |
| 2011/0320187 A1* | 12/2011 | Motik et al. | 704/9 |
| 2012/0078891 A1* | 3/2012 | Brown et al. | 707/723 |
| 2013/0007055 A1 | 1/2013 | Brown et al. | |
| 2013/0018652 A1 | 1/2013 | Ferrucci et al. | |
| 2013/0066886 A1* | 3/2013 | Bagchi et al. | 707/749 |
| 2013/0117257 A1* | 5/2013 | Meijer et al. | 707/719 |
| 2013/0297553 A1* | 11/2013 | Bierner | 706/52 |
| 2014/0172139 A1 | 6/2014 | Clark et al. | |
| 2014/0172756 A1 | 6/2014 | Clark et al. | |
| 2014/0172878 A1 | 6/2014 | Clark et al. | |
| 2014/0172880 A1* | 6/2014 | Clark et al. | 707/748 |
| 2014/0172882 A1 | 6/2014 | Clark et al. | |
| 2014/0172883 A1 | 6/2014 | Clark et al. | |
| 2014/0377735 A1* | 12/2014 | Byron et al. | 434/362 |

OTHER PUBLICATIONS

Broder et al., "Syntactic Clustering of the Web", Jul. 25, 1997, Digital System Research Center, pp. 1-13.*

Jebbor et al., "Overview of Knowledge Extraction Techniques in Five Question Answering Systems", 2014, pp. 1-8.*

U.S. Appl. No. 13/923,029, 1 page.

Burke, Robin et al., "Natural Language Processing in the FAQ Finder System: Results and Prospects", AAAI Technical Report SS-97-02, http://www.aaai.org/Papers/Symposia/Spring/1997/SS-97-02/SS97-02-003.pdf, pp. 17-26.

Clark, Adam T. et al., "Intelligent Evidence Classification and Notification in a Deep Question Answering System", filed Mar. 11, 2013, U.S. Appl. No. 13/793,911.

Clark, Adam T. et al., "Intelligent Evidence Classification and Notification in a Deep Question Answering System", filed Dec. 17, 2012, U.S. Appl. No. 13/717,146.

Clark, Adam T. et al., "Partial and Parallel Pipeline Processing in a Deep Question Answering System", filed Mar. 11, 2013, U.S. Appl. No. 13/793,809.

Clark, Adam T. et al., "Partial and Parallel Pipeline Processing in a Deep Question Answering System", filed Dec. 17, 2012, U.S. Appl. No. 13/717,105.

Clark, Adam T. et al., "Question Classification and Feature Mapping in a Deep Question Answering System", filed Feb. 18, 2013, U.S. Appl. No. 13/769,409.

Clark, Adam T. et al., "Question Classification and Feature Mapping in a Deep Question Answering System", filed Dec. 17, 2012, U.S. Appl. No. 13/717,043.

High, Rob, "The Era of Cognitive Systems: An Inside Look at IBM Watson and How it Works", IBM Corporation, Redbooks, Dec. 12, 2012, 16 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

CACHING NATURAL LANGUAGE QUESTIONS AND RESULTS IN A QUESTION AND ANSWER SYSTEM

This application is a continuation of application Ser. No. 13/923,029, filed Jun. 20, 2013.

BACKGROUND

The present application relates generally to an improved data processing apparatus and method and more specifically to mechanisms for caching natural language questions and results in a question and answer (QA) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for answering an input question. The method comprises receiving, in the data processing system, an input question to be answered from a source and processing, by the data processing system, the input question to extract one or more features of the input question. The method further comprises comparing, by the data processing system, the extracted one or more features to cached features stored in one or more entries of a question and answer (QA) cache of the data processing system. Moreover, the method comprises determining, by the data processing system, whether there is a matching entry in the one or more entries of the QA cache based on results of the comparing and retrieving, by the data processing system, in response to a matching entry being present in the one or more entries of the QA cache, candidate answer information from the matching entry. In addition, the method comprises returning, by the data processing system, the retrieved candidate answer information to the source of the input question as candidate answer information for answering the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
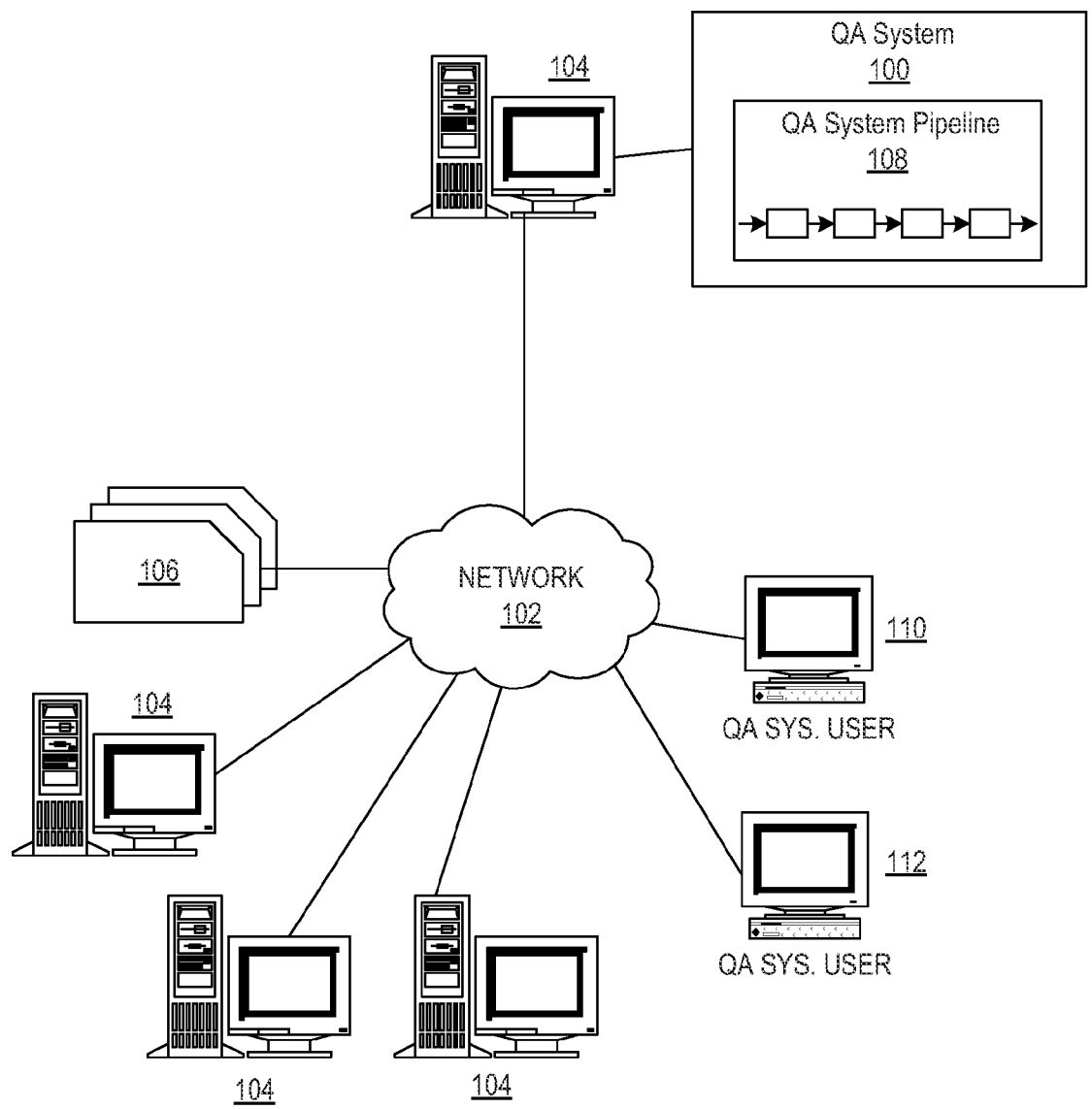
FIG. 1 is an example diagram of a distributed data processing system in which aspects of a Question and Answer system of the illustrative embodiments may be implemented.

Question and Answer (QA) systems, such as IBM's Watson™ QA system, require a significant amount of compute power to analyze a natural language question and determine the results from candidate findings. Thus, it is desirable to reduce the required amount of compute power whenever possible. The illustrative embodiments provide mechanisms to cache natural language questions and their corresponding answers to reduce the computational time/resources required to provide a response to a submitted question. In instances where a submitted question is significantly similar to a previously processed question, much of the QA system pipeline processing can be circumvented and answers previously generated for a previously processed similar question may be used. In this way, response time is increased and computational time/resources are significantly reduced.

In general, methods for caching search queries for full text indices, relational databases, and other types of data stores are known. However, these known mechanisms are generally scoped to retrieval of data from a primary store based on a cache of normalized terms or query components and/or changes within the temporal aspects of the data. Contrary to these known mechanisms, the illustrative embodiments of the present invention provide mechanisms for caching questions and answers and providing a mechanism for comparing currently received questions with previously cached questions to determine similarities and identify potential answers for the currently received questions based on previously submitted similar questions and the answers that were generated for these previously submitted similar questions.

With the mechanisms of the illustrative embodiments, a cache store is provided for storing information about previously processed questions and the candidate answers returned by a QA system as part of the processing of these questions. Moreover, logic is provided to determine a similarity between a current question being processed and one or more of the cached previously processed questions. If a sufficiently similar cached previously processed question is identified, then the corresponding cached candidate answers may be retrieved and used to generate a set of candidate answers for the question currently being processed. As a result, the lengthy and resource intensive natural language processing of the question and the candidate answers by a QA system may be avoided by returning the cached candidate answers as the candidate answers for the currently processed question.

During question processing in a QA system, the question undergoes a complex analysis comprising many multi-step processes such as parsing, part-of-speech tagging, named entity detection, and other feature extraction processes, annotation, and the like. Once the particular question is answered through the generation of a set of candidate answers and a final answer for the input question, the results of the analysis, e.g., the extracted features, named entities, part of speech tag information, and the like, are lost and would have to be re-created even if the exact same question is submitted again. That is, the complex, lengthy, and resource intensive analysis would have to be repeated due to the loss of the intermediate analysis result information.

With the mechanisms of the illustrative embodiments, the intermediate natural language processing result information is persisted in a cache store in association with the ultimate candidate answer result(s) returned by the QA system to the submitter of the input question. The persisted intermediate natural language processing result information is used as a basis for determining a similarity between a newly submitted question and the previously processed question that caused the intermediate natural language processing result information to be generated and persisted, hereafter referred to as the previously processed question. When a new question is received for processing by the QA system, the new question is parsed and partially processed to extract a minimized preliminary set of features sufficient enough to identify a similar previously processed question in the cache store, if one exists.

Logic is provided for identifying a previously processed question in the cache store that is the most similar to the newly received question. Thresholds may be provided for identifying a minimum level of similarity required to identify a sufficiently similar previously processed question in the cache store. If a previously processed question is identified in the cache store that has the minimum level of similarity, the most similar previously processed question is selected and its corresponding candidate answer(s), or final answer, is returned as the candidate answer(s) or final answer for the newly received question, thereby eliminating the need to re-execute the entire QA system pipeline analysis. New questions for which a sufficiently similar matching previously processed question in the cache store cannot be found will undergo the standard QA system pipeline analysis with its information being cached in the cache store for use in handling the processing of future questions. If previously processed questions in the cache store are identified that do not have the requisite minimum level of similarity, but may be within a particular range of this minimum level of similarity, such as may be defined by one or more thresholds, then a listing of these previously processed questions may be returned for user selection of a correct candidate answer for the newly submitted question. This information may likewise be fed back to the cache logic to update the cache store with information indicating the answer selected by a user as a correct answer for the cached previously processed question.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
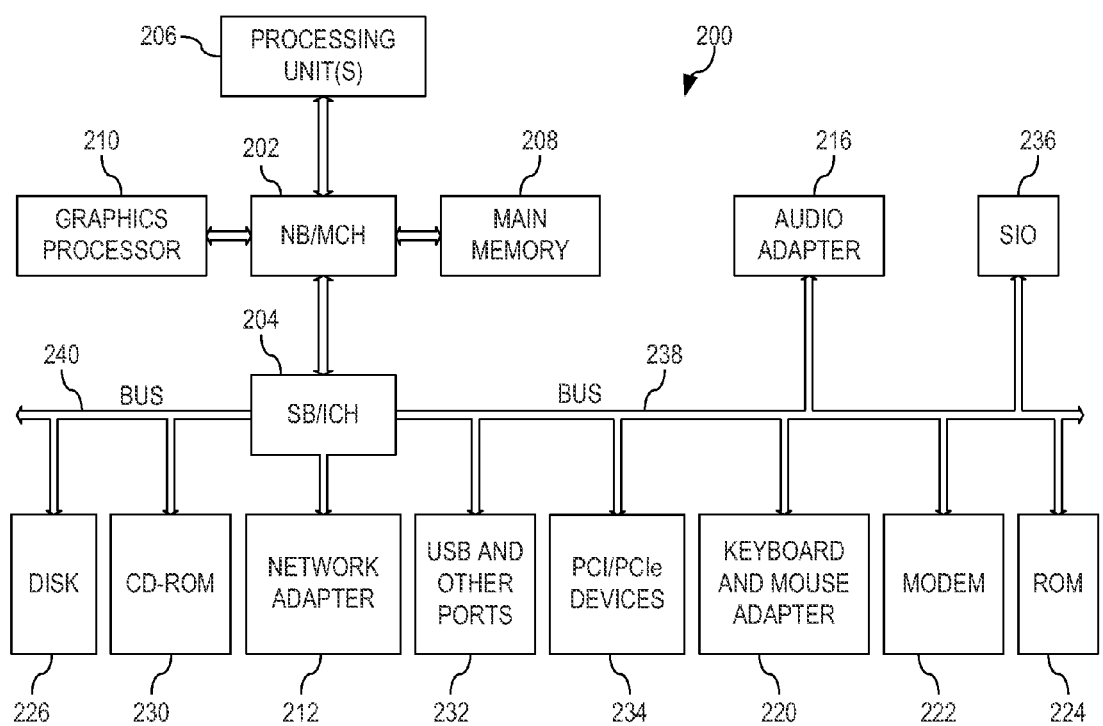
FIG. 2 is an example block diagram of a computing device in which aspects of the illustrative embodiments may be implemented.
Figure 3:
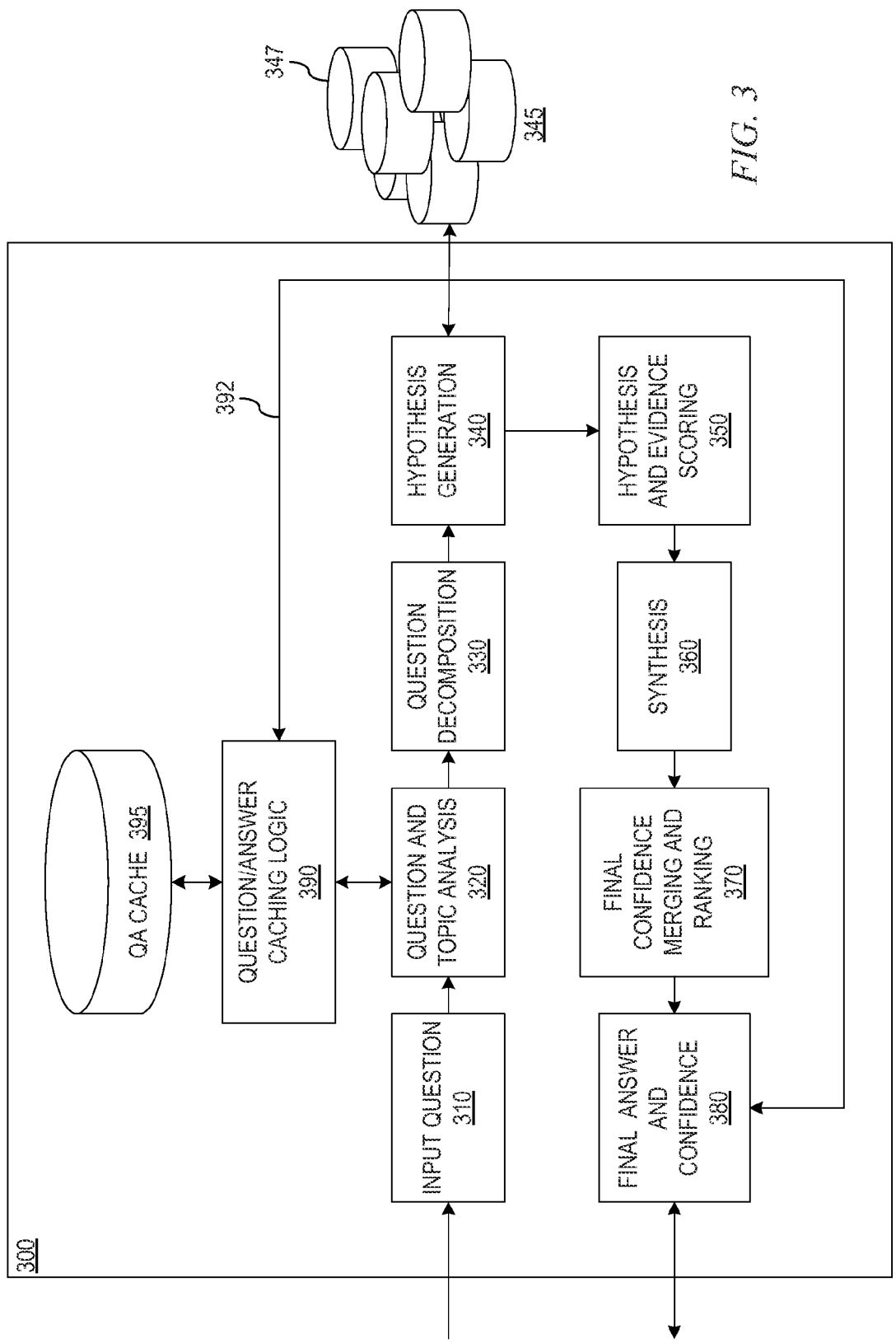
FIG. 3 illustrates a QA system pipeline for processing an input question in accordance with one illustrative embodiment.

The illustrative embodiments may be utilized in many different types of data processing environments. FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to caching intermediate question processing information and resulting corresponding candidate answer information for purposes of processing subsequent similar questions. FIGS. 1-3 are intended to be only examples of data processing environments in which the aspects of the various illustrative embodiments may be implemented. Many modifications may be made to the depicted example environments without departing from the spirit and scope of the present invention.

Since the illustrative embodiments augment and extend the functionality of QA systems, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources, where the term "pipeline" refers to a series of stages of analysis/execution, performed by one or more sets of logic, modules, engines, or the like, in the QA system 100. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

It should be appreciated that, while the Watson™ QA system is used as one example of a QA system that may be used with some illustrative embodiments, the illustrative embodiments, and the present invention as a whole, are not limited to implementation in, or in association with, the Watson™ QA system. To the contrary, and natural language processing based question answering system may be augmented, in view of the present description, to implement the mechanisms of the illustrative embodiments without departing from the spirit and scope of the present invention.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Putin's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Putin" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpus of data/information 345 in order to generate one or more hypotheses. The queries may be applicable to both structured and non-structured data in the corpus of data/information 345 and may be generated in any known or later developed query language, such as the Structure Query Language (SQL), NoSQL, full text searches, or the like. The queries may be applied to one or more databases storing information about the electronic texts, documents, articles, websites, and the like, that make up the corpus of data/information 345. That is, these various sources themselves, collections of sources, and the like, may represent different corpora 347 within the corpus 345. There may be different corpora 347 defined for different collections of documents based on various criteria depending upon the particular implementation. For example, different corpora may be established for different topics, subject matter categories, sources of information, or the like. As one example, a first corpora may be associated with healthcare documents while a second corpora may be associated with financial documents. Alternatively, one corpora may be documents published by the U.S. Department of Energy while another corpora may be IBM Redbooks documents. Any collection of content having some similar attribute may be considered to be a corpora 347 within the corpus 345.

The queries may be applied to one or more databases, knowledge bases, indices, or the like, that store information about the electronic texts, documents, articles, websites, and the like, that make up the corpus of data/information, e.g., the corpus of data 106 in FIG. 1. The queries being applied to the corpus of data/information 345 at the hypothesis generation stage 340 to generate results identifying potential hypotheses for answering the input question which can be evaluated. That is, the application of the queries results in the extraction of portions of the corpus of data/information 345 matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question. The set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

As shown in FIG. 3, the illustrative embodiments provide question/answer caching logic 390 and QA cache 395 which may interface with the question and topic analysis stage 320 and final answer and confidence stage 380. As discussed above, during the question and topic analysis stage 320, the input question 310 is parsed using natural language processing (NLP) techniques to extract major features from the input question, classify the major features according to types, etc. The extracted features may also be provided to the question/answer caching logic 390. The question/answer caching logic 390 may compare the extracted features to those stored for previously processed questions in the QA cache 395. The question/answer caching logic 390 may determine a degree of matching between the extracted features for the current input question 310 and the features of the previously processed questions in the QA cache 395. In some embodiments, the extracted features of the current input question 310 may also be compared against features of the candidate answers stored in the QA cache 395 for previously submitted questions. The degree of matching, or match value, may be compared against one or more predetermined thresholds to determine if an entry in the QA cache 395 corresponding to a previously processed question has sufficient similarity to the current input question 310. If not, then the current input question 310 is processed in a manner as previously described above and a new entry for the current input question 310 is created by the question/answer caching logic 390 in the QA cache 395. The creation of the new entry may require the eviction of an existing entry if the QA cache 395 is presently full. Any cache eviction policy may be implemented by the question/answer caching logic, including least recently used (LRU), least used (if counters are associated with cache entries), or the like.

In some illustrative embodiments, rather than creating a new entry in the QA cache 395, in some cases the content of the new entry may instead be appended as additional entry information for an already existing entry in the QA cache 395. That is, if the current input question 310 is determined to be sufficiently similar, such as by comparison of a measure of a degree of matching with one or more thresholds, to an existing cached question in the QA cache 395, but not similar enough to utilize the QA cache 395 entry as the source of the candidate answers for the current input question 310, then the elements of the current input question 310 may be added to the existing QA cache 395 entry along with any candidate answer information generated by the normal operation of the QA system pipeline on the current input question, thereby gradually expanding the applicability of the QA cache 395 entry to sufficiently similar subsequent questions.

In either case, the entry that is created in the QA cache 395 for the current input question 310, or the updates to an existing QA cache 395 entry, comprises the set of extracted features for the input question 310. Ultimately, once the final answer, or final set of candidate answers, is generated at final answer and confidence stage 380, the final answer and confidence information is also stored in the entry in the QA cache 395. This may include, for example, information about the final answer(s) that were generated, the confidence measure(s) associated with the final answer(s), any rankings for the final answer(s) generated for generating a ranked listing, any evidence information indicating the evidence used to generate the answer(s) and confidence measure(s), or any other pertinent information for question answering used by the QA system. Thus, the entry in the QA cache 395 comprises at least a set of extracted features from the input question 310 and the final answer and confidence information for the one or more answers generated by the QA system pipeline 300. Other information about the input question may also be stored in the entry, such as a determined domain of the input question, information about a submitter of the input question, time of receipt of the input question, or any other characteristics about the input question that may have a bearing on its ability to be used to provide answers for subsequently submitted input questions.

If the question/answer caching logic 390 searches the QA cache 395 for a matching entry having extracted features, candidate answer features, or the like, for a previously processed question that sufficiently match the extracted features for the current input question 310, a matching entry is found, then the question/answer caching logic 390 may forward the corresponding final answer and confidence information stored in the matching entry to the final answer and confidence stage 380 for output as the final answer and confidence information for the current input question 310, as illustrated by the communication connection 392. In essence, the question/answer caching logic 390, via communication connection 392, circumvents stages 330-370 of the QA system pipeline 300 and avoids the computation time and resources required to implement these stages 330-370.

The determination as to whether an entry exists in the QA cache 395 that sufficiently matches the input question 310, as mentioned above, may be based on a degree of matching between the extracted features of the input question 310 and the extracted features, candidate answer features, and/or the like, stored in the various entries of the QA cache 395. For example, the key terms, phrases, and the like, extracted from the input question, along with the corresponding type information, e.g., whether the term is a focus of the question, identifies a lexical answer type (LAT), is part of a clue section, is a particular part of speech, or the like, may be compared to terms, phrases, etc., and type information stored in the entries of the QA cache 395. Moreover, if additional information is being used in the QA cache 395 and the QA system 300, such as domain, question submitter information, time of receipt information, or other characteristics information, similar comparisons may be made between this additional information extracted from the input question 310 and the stored information in the entries of the QA cache 395.

Quantitative values may be calculated for matching characteristics between the input question and the entries of the QA cache 395. That is, characteristics that match between the input question 310 and an entry in the QA cache 395 increase a degree of matching score for the entry. Various weights may be applied to different types of characteristic information, e.g., greater weights given for matching domains, greater weights for matching submitters of questions, giving greater weights for matching terms in candidate answers of entries in the QA cache 395, etc. Combining the quantitative values for the matching characteristics gives a measure of the degree of matching between the input question 310 and an entry in the QA cache 395. This degree of matching measure may be compared against one or more threshold values to determine if the entry is sufficiently matching of the input question 310 to warrant using the entry's corresponding answer and confidence measure information as the final answer and confidence information for the input question 310.

In one illustrative embodiment, the one or more threshold values comprises a minimum level of matching required for the entry to be considered a matching entry. If this minimum level of matching is met or exceeded by the degree of matching measure for the entry, then the entry may be determined to be sufficiently matching of the input question. If this minimum level of matching is not met or exceeded by the degree of matching measure for the entry, then the entry is determined to be not sufficiently matching of the input question. This generation of measures of degrees of matching and comparison to one or more thresholds may be repeated for each of the entries in the QA cache 395.

Multiple entries in the QA cache 395 may be found to be sufficiently matching of the input question 310. Each of the entries being found to be sufficiently matching of the input question 310 may be returned to the final answer and confidence stage 380 for use in generating the final answer and confidence information. Thus, multiple sets of candidate answers and corresponding confidence information may be returned to the final answer and confidence stage 380 and may be merged to generate a single final answer and confidence measure output, a ranked listing of candidate answers and corresponding confidence information, or the like.

In some illustrative embodiments, a plurality of thresholds may be utilized. For those entries whose degree of matching measures meet various ones of the thresholds, various operations may be implemented to return the corresponding answer and confidence information to a submitter of the input question 310 in a manner that the submitter may utilize the answer and confidence information in accordance with its level of matching. For example, if the degree of matching of an entry is above a first threshold indicative of a possible matching entry, but less than a second threshold indicative of an actual matching entry, then the entry may be returned as a possible matching entry and its corresponding answer and confidence information may be returned as a possible answer and confidence for the input question 310. User feedback may be returned to the final answer and confidence stage 380 logic in response, and this information may be used to determine whether the input question 310 should be passed through the remaining stages 330-370 to generate a more accurate answer and confidence for the input question 310. That is, if the user determines, after being presented with the possible answers and confidence measures, that none of the possible answers and confidence measures are sufficient, then the user may return feedback indicating so which is then provided to the question/answer caching logic 390 which causes the question and topic analysis stage 320 logic to forward the question on to the later stages 330-370.

In addition, if a user selects a candidate answer and confidence information as being a correct final answer for the input question 310, this information may be returned to the final answer and confidence stage 380 logic which communicates it to the question/answer caching logic 390. Such information may be used to modify the relative level of matching of the entry in the QA cache 395. For example, one or more weights associated with the entry may be adjusted to give the entry greater weighting when determining a degree of matching of the entry with subsequent similar questions submitted to the QA system pipeline 300.

Thus, the illustrative embodiments provide mechanisms for caching questions information and their corresponding answer and confidence measure information and using this information to answer subsequently submitted questions. The mechanisms of the illustrative embodiments may circumvent and avoid the computation time and resource utilization required to perform a full analysis and answer of an input question. This greatly improves performance of the QA system and increases the speed at which the QA system may answer similar questions.

For example, assume that a previously submitted question is of the type "Who was the first President of the United States?" and the candidate answers that were returned are "President Washington" with a confidence of 60%, "George Washington" with a confidence of 90%, and "Washington" with a confidence of 85%. The features extracted from this example question may be "who", "first", "President", and "United States." The extracted feature information and answer/confidence information may be cached in the QA cache 395 in the manner previously described above.

Assume that a subsequent question is submitted to the QA system 300 of the type "Was George Washington the first President?" The features extracted from this question may be "Was", "George Washington", "first", and "President." From this example, it can be determined that the terms/phrases "first" and "President" match between the entry in the QA cache 395 and the extracted feature of the subsequently submitted question, both with regard to the content of these terms/phrases as well as additional deep semantic analysis of the use of these terms/phrases in the context of the questions, whereas the terms "was" and "George Washington" do not have a match in the extracted features of the entry in the QA cache 395. However, the term "George Washington" does match one of the candidate answers for the entry in the QA cache 395. Thus, after identifying the matching features of the subsequent question with the features stored in the entry in the QA cache 395, and calculating a score based on the identified matching, the score may be compared against a threshold. If the threshold is met or exceeded, then a determination is made that the entry matches the input question and the corresponding candidate answers may be returned as answers for the subsequent question. In this case, if the previous entry is determined to be matching, and it is determined that the subsequent question is looking for a "yes" or "no" answer, and the candidate answers comprise the answer "George Washington", then an answer of "yes" may be returned with a high confidence rating.

Figure 4:
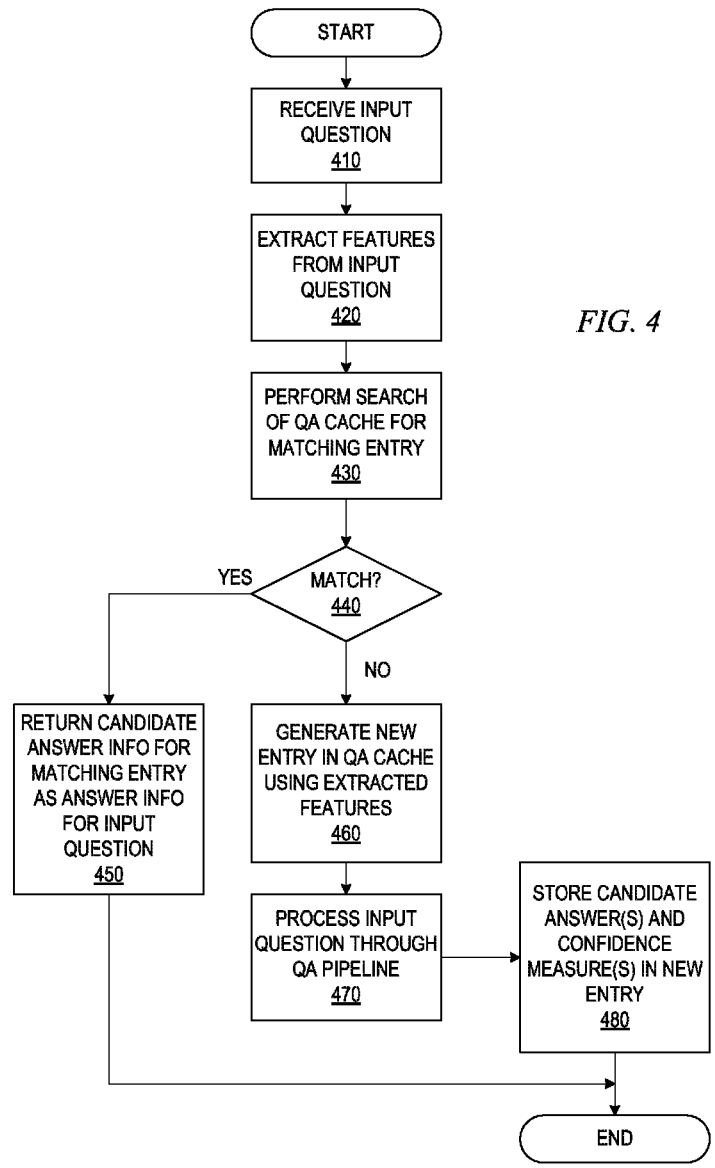
FIG. 4 is a flowchart outlining an example operation of a QA system pipeline implementing caching logic in accordance with one illustrative embodiment.

FIG. 4 is a flowchart outlining an example operation of a QA system pipeline implementing caching logic in accordance with one illustrative embodiment. As shown in FIG. 4, the operation starts by receiving an input question for processing by the QA system (step 410). The input question is parsed and analyzed to extract features from the input question (step 420). The extracted features of the input question are provided to question/answer caching logic that performs a search of a QA cache for entries having matching features/candidate answers to that of the extracted features of the input question (step 430). A determination is made as to whether a matching entry is found in the QA cache (step 440). If so, the candidate answer and confidence information stored in the matching entry is returned as answer and confidence information for the input question (step 450). If not, then a new entry is generated in the QA cache using the extracted features of the input question (step 460). The input question is processed by the QA system pipeline (step 470) and the resulting candidate answer and confidence information is stored in the new entry in the QA cache (step 480). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for answering an input question, the method comprising:
   receiving, in the data processing system, an input question to be answered from a source;
   processing, by the data processing system, the input question to extract one or more features of the input question;
   comparing, by the data processing system, the extracted one or more features to cached features stored in one or more entries of a question and answer (QA) cache of the data processing system;
   determining, by the data processing system, whether there is a matching entry in the one or more entries of the QA cache based on results of the comparing, wherein determining whether there is a matching entry in the one or more entries of the QA cache comprises:
      generating, for each entry in the QA cache, a match value indicative of a degree of matching between the one or more extracted features of the input question to cached features of the entry in the QA cache; and
      comparing the match value to one or more threshold values indicating one or more requisite degrees of similarity between the input question and an entry in the QA cache, wherein:
         in response to the match value equaling or exceeding a first threshold value, a corresponding entry is determined to match the input question, and
         in response to the match value being less than the first threshold value but the match value being equal to or greater than a second threshold value, determining that the corresponding entry is sufficiently similar for updating the corresponding entry with the one or more extracted features of the input question;
   retrieving, by the data processing system, in response to a matching entry being present in the one or more entries of the QA cache, candidate answer information from the matching entry; and
   returning, by the data processing system, the retrieved candidate answer information to the source of the input question as candidate answer information for answering the input question.

2. The method of claim 1, wherein, in response to determining that there is a matching entry in the one or more entries of the QA cache, processing of the input question by a predetermined set of QA system pipeline stages is circumvented.

3. The method of claim 1, further comprising:
   in response to determining that there is not a matching entry in the one or more entries of the QA cache, processing the input question through a QA system pipeline to generate one or more generated candidate answers for answering the input question.

4. The method of claim 3, further comprising:
   in response to determining that there is not a matching entry in the one or more entries of the QA cache, generating a new cache entry in the QA cache for the input question, wherein the new entry in the QA cache comprises the extracted one or more features of the input question stored in association with the one or more generated candidate answers for the input question.

5. The method of claim 3, further comprising:
   in response to determining that there is not a matching entry in the one or more entries of the QA cache and in response to determining that a selected entry in the QA cache has a predetermined degree of similarity to the input question, updating the selected entry with the extracted one or more features of the input question in association with the one or more generated candidate answers for the input question.

6. The method of claim 1, wherein, in response to determining that there is not a matching entry in the one or more entries of the QA cache:
   determining if there is a subset of entries in the one or more entries that is similar to the input question; and
   outputting a listing of the subset of entries to a user for user selection of an entry in the subset of entries to be retrieved and used to generate candidate answers for the input question.

7. The method of claim 1, wherein entries in the QA cache comprise extracted features for previously processed questions with corresponding candidate answer infatuation and confidence measures associated with the candidate answers.

8. The method of claim 7, wherein the entries in the QA cache further comprise at least one of ranking information for the candidate answer, evidence information indicating the evidence used to generate the candidate answer, a determined domain of a corresponding previously processed question, information about a submitter of the corresponding previously processed question, or time of receipt of the corresponding previously processed question.

* * * * *